United States Patent [19]
Ikoma et al.

[11] Patent Number: 4,994,334
[45] Date of Patent: Feb. 19, 1991

[54] SEALED ALKALINE STORAGE BATTERY AND METHOD OF PRODUCING NEGATIVE ELECTRODE THEREOF

[75] Inventors: Munehisa Ikoma, Katano; Yasuko Ito, Kyoto; Kohji Yuasa, Moriguchi; Isao Matsumoto, Osaka; Takashi Hino, Hirakata, all of Japan

[73] Assignee: Matsushita Electric Industrial Co., Ltd., Osaka, Japan

[21] Appl. No.: 356,247

[22] Filed: May 24, 1989

[30] Foreign Application Priority Data

Feb. 28, 1989 [JP] Japan .................................. 1-47637

[51] Int. Cl.$^5$ ........................................ H01M 10/52
[52] U.S. Cl. .................................. 429/206; 429/212; 429/59; 252/182.1
[58] Field of Search ................... 429/206, 218, 42, 44, 429/212, 223, 224, 57, 59

[56] References Cited

U.S. PATENT DOCUMENTS

| | | | |
|---|---|---|---|
| 3,850,694 | 11/1974 | Dunlop et al. | 429/27 X |
| 3,959,018 | 5/1976 | Dunlop et al. | |
| 4,048,406 | 9/1977 | Sandera et al. | 429/217 X |
| 4,098,962 | 7/1978 | Dennison | |
| 4,112,199 | 9/1978 | Dunlop et al. | |
| 4,206,277 | 6/1980 | Faber | 429/234 |
| 4,214,043 | 7/1980 | van Deutekom | 429/27 |
| 4,312,928 | 1/1982 | van Detekom | 429/27 |
| 4,487,817 | 12/1984 | Willems et al. | 429/27 |
| 4,636,445 | 1/1987 | Yamano et al. | 429/53 |
| 4,702,978 | 10/1987 | Heuts et al. | 429/218 |
| 4,752,546 | 6/1988 | Heuts et al. | 429/218 |
| 4,826,744 | 5/1989 | Itou et al. | 429/206 |
| 4,837,119 | 6/1989 | Ikoma et al. | 429/206 |

FOREIGN PATENT DOCUMENTS

| | | |
|---|---|---|
| 58-163157 | 9/1983 | Japan . |
| 58-201271 | 11/1983 | Japan . |
| 60-100382 | 6/1985 | Japan . |
| 62-139255 | 6/1987 | Japan . |
| 1125896 | 9/1968 | United Kingdom . |
| 2027979 | 2/1980 | United Kingdom . |

OTHER PUBLICATIONS

"Chemical Abstracts," vol. 91, No. 2, p. 135, Abstract No. 7342a, Columbus, Ohio, Jul. 1979.
"Chemical Abstract," vol. 100, No. 18, p. 182, Abstract No. 142237q, Columbus, Ohio, Apr. 1984.

*Primary Examiner*—Anthony Skapars
*Attorney, Agent, or Firm*—Stevens, Davis, Miller & Mosher

[57] ABSTRACT

Disclosed is an alkaline storage battery using a negative electrode formed of a hydrogen absorbing alloy capable of absorbing/desorbing hydrogen electrochemically. A three-dimensional structural matter having hydrophobic property is used as a supporter for supporting the hydrogen absorbing alloy of the negative electrode, so that hydrophobic property is given to the surface of the hydrogen absorbing alloy which is in contact with the support, whereby a hydrogen gas generated in a charging period is absorbed by powder of the alloy exposed at a gas phase portion to suppress the increase of the internal gas pressure of the battery.

According to the present invention, it is possible to perform rapid charge in a short time because the increase of the internal gas pressure of the battery can be suppressed.

21 Claims, 3 Drawing Sheets

SEALED ALKALINE STORAGE BATTERY AND METHOD OF PRODUCING NEGATIVE ELECTRODE THEREOF

BACKGROUND OF THE INVENTION

The present invention relates to a sealed alkaline storage battery using a negative electrode of a hydrogen absorbing alloy capable of electrochemically absorbing/desorbing hydrogen acting as an active material.

Recently, hydrogen absorbing alloys capable of electro-chemically absorbing/desorbing hydrogen acting as an active material have attracted attention for use as a negative electrode material having high energy density. High-capacity sealed storage batteries such as a sealed nickel-hydrogen storage battery and a closed manganese dioxide-hydrogen storage battery have been developed by combining this type negative electrodes and available positive electrodes such as a nickel positive electrode and a manganese dioxide positive electrode. In the past, this type negative electrodes for use in the sealed nickel-hydrogen storage battery and methods of producing this type negative electrodes have been proposed as follows.

(1) A method of producing a negative electrode comprising filling a nickel porous matter having a three-dimensional structure with hydrogen absorbing alloy powder together an alkali-resisting binding agent (Japanese Patent Unexamined Publication No. 53-38631).

(2) A method of producing a negative electrode comprising the steps of: applying hydrogen absorbing alloy powder to a supporting metal; and sintering the alloy powder in an atmosphere of an inert gas (Japanese Patent Unexamined Publication No. 62-278754).

(3) A method of producing a negative electrode comprising the steps of: kneading hydrogen absorbing alloy powder and polytetrafluoroethylene (hereinafter referred to as "PTFE") powder or its aqueous solution dispersion while applying shearing stress thereto; pressing the kneaded matter to prepare a sheet; and sticking the sheet to a nickel net or the like (Japanese Patent Unexamined Publication No. 60-136162).

(4) A method in which at least one portion of a negative electrode formed of a hydrogen absorbing alloy is provided with a hydrophobic layer (Japanese Patent Unexamined Publication No. 61-118963).

The negative electrodes produced by the aforementioned methods have a disadvantage in that short-time (about an hour) charging required in various types of portable apparatus and the like is difficult or in that the reliability of the battery may deteriorate with repetition of charging/discharging though short-time (rapid) charging may be made in the early stage where the battery is just constructed. When the prior art negative electrodes formed by the above methods (1) and (2) are subject to relatively slow charging with respect to which the time required for perfect charging is within a range of from about 4.5 hours to about 16 hours, there arises no problem particularly awaiting solution. When the prior art negative electrodes produced by the above methods (1) and (2) are subject to rapid charging, however, the internal gas pressure of the battery increases in an overcharging period so that a safety vent (which is, in general, actuated by the battery inner pressure of 10 to 15 $kg/cm^2$ in the same manner as an ordinary nickel-cadmium battery) is actuated so that the alkaline electrolyte of the battery leaks to constitute an obstacle to various battery characteristics and safety. Accordingly, in the prior art negative electrodes produced by the above methods (1) and (2), short-time charging is impossible.

In the prior art negative electrode produced by the above method (3), the respective sheets composed of fiber-like fluororesin and hydrogen absorbing alloy powder are located on the opposite sides of the nickel net respectively. In the configuration of the negative electrode, the fiber-like fluororesin gives suitable hydrophobic property to the surfaces of the hydrogen absorbing alloy powders to improve gas absorption ability in an overcharging period to thereby make it possible to perform short-time charging in the early stage where the battery is just constructed. It is however very difficult to prepare reproducibly similar sheets by the aforementioned steps of; kneading hydrogen absorbing alloy powder and PTFE powder while applying shearing stress thereto; and pressing the mulled matter. Accordingly, the internal gas pressure of the battery in a short-time charging period varies widely and sometimes exceeds 20 $kg/cm^2$. Furthermore, the negative electrode is inferior in mechanical strength because the sheet formed by tangling the alloy particles with the fluororesin fibers is stuck to the nickel net. Accordingly, the alloy and the fluororesin are subject to expansion/contraction due to repetition of charging/discharging and changes in temperature, resulting in deterioration in the negative electrode. Accordingly, the prior art negative electrode produced by the above method (3) has a problem in that the reliability of the battery deteriorates with repetition of charging/discharging.

The proposal by the above method (4) is that a hydrophobic layer is provided in a portion of a negative electrode to thereby improve gas absorption capacity in an overcharging period. Although short-time charging is possible in this case, there arises a problem in that the hydrophobic layer provided in the negative electrode is made to come off by the expansion/contraction of the alloy due to repetition of charge/discharge or by a gas generated, so that the internal gas pressure of the battery increases with repetition of charging/discharging cycles.

OBJECTS AND SUMMARY OF THE INVENTION

It is therefore an object of the present invention to solve the aforementioned problems in the prior art.

That is to say the object of the invention is to provide a highly reliable sealed alkaline storage battery in which the battery internal gas pressure never rises over the actuation pressure of a safety vent even if short-time charging is performed, and never rises even if charging/discharging cycles are repeated.

In order to achieve the above objects, according to the present invention, in a sealed alkaline storage battery comprising a positive electrode constituted mainly by a metal oxide, a negative electrode constituted mainly by a hydrogen absorbing alloy capable of absorbing/desorbing hydrogen acting as an active material and a support for supporting said alloy, an alkaline electrolyte, and a separator, the supporter is made to have a three-dimensional structure having hydrophobic property. Further, in the above-mentioned sealed alkaline storage battery, the supporter is made to have a three-dimensional structure having hydrophobic property and a surface portion of the negative electrode is provided with hydrophobic property.

Further, according to the present invention, the method of producing a negative electrode for the above-mentioned sealed alkaline storage battery comprises the steps of: depositing a fluororesin on a skeletal portion of a nickel porous matter having a three-dimensional structure; fixing the fluororesin to the skeletal portion of the nickel porous matter by heat treatment at a temperature lower than the temperature of decomposition of the fluororesin to thereby prepare a support having a hydrophobic portion, and preparing a negative electrode through filling the support with paste mainly containing a hydrogen absorbing alloy, drying the electrode and then pressing/cutting the electrode into predetermined thickness and size.

DETAILED DESCRIPTION OF THE INVENTION

The principle of sealed cell construction in a nickel-hydrogen storage battery is the same as that in a nickel-cadmium battery which has been proposed by Neumann. Also in the nickel-hydrogen storage battery, the maximum charge capacity of the negative electrode is established to be larger than the maximum charge capacity of the positive electrode. That is to say, the negative electrode is not perfectly charged even in the condition that the positive electrode has been perfectly charged. Accordingly, hydrogen gas is prevented from being generated from the negative electrode in an overcharging period. At the same time, oxygen gas generated from the positive electrode is reduced on the negative electrode by the reaction represented by the following formula (1) to keep the closing state of the battery.

$$MH_x + O_2 \rightarrow MH_{x-4} + 2H_2O \tag{1}$$

In the formula (1) M represents a hydrogen absorbing alloy.

However, in the case where the negative electrode using a hydrogen absorbing alloy is charged, the hydrogen absorbing reaction and the hydrogen generation reaction respectively represented by the following formula (2) and (3) occur in the last stage of the charging period. The reaction of the formula (3) occurs more easily as the battery is charged more rapidly.

$$M + H_2O + e^- \xrightarrow{charge} MH + OH^- \tag{2}$$

In the formula (2) M represents a hydrogen absorbing alloy.

$$H_2O + e^- \rightarrow OH^- + H_2 \uparrow \tag{3}$$

Accordingly, the increase of the internal gas pressure of the sealed nickel-hydrogen storage battery in the overcharging period is caused by both oxygen gas generated from the positive electrode and hydrogen gas generated from the negative electrode. In this battery system, the reaction of oxygen gas reduction represented by the formula (1) progresses relatively rapidly even in the case where the battery is subject to rapid charging. Accordingly, the increase of the battery internal pressure caused by oxygen gas is not important in this battery system. On the other hand, in the case where the negative electrode is prepared by an ordinary producing method, hydrogen gas generated in accordance with the formula (3) is difficult to absorb. Accordingly, the increase of the battery internal pressure caused by hydrogen gas becomes severer as the battery is charged more rapidly.

According to the present invention, a supporter of a three-dimensional structure having hydrophobic property is used in the negative electrode, so that when the negative electrod is assembled, a hydrophobic property is given to the surfaces of hydrogen absorbing alloy particles which are in contact with the supporter. Accordingly, hydrogen gas generated by the reaction represented by the formula (3) is absorbed smoothly into the alloy powders being not in contact with the electrolytic solution, by the gas phase reaction represented by the following formula (4) to thereby suppress increase of the battery internal gas pressure, because the hydrogen absorbing alloy of the negative electrode has a sufficient absorption capacity.

$$M + H_2 \rightarrow MH_2 \tag{4}$$

In the formula (2) M represents a hydrogen absorbing alloy.

If a portion having a hydrophobic layer is further provided on the surface portion of the negative electrode, the reaction of the formula (4) progresses so much more rapidly that the battery inner pressure is little increased in a rapid charging period.

According to the aforementioned construction of the negative electrode, the hydrogen absorbing alloy particles are kept in the three-dimensional porous matter having hydrophobic property to improve the mechanical strength thereof to thereby prevent lowering of hydrophobic property caused by repetition of charging/discharging. Further, the negative electrode is not affected by expansion/contraction of the hydrogen absorbing alloy, so that the internal gas pressure of the battery is increased little regardless of repetition of charging/discharging cycles.

Also in the case where the nickel porous matter having a three-dimensional structure is filled with paste mainly containing hydrogen absorbing alloy powder in accordance with the negative electrode producing method of the present invention, the fluororesin is not easily disconnected from the nickel porous matter because the fluororesin is fixed to the skeletal portion of the nickel porous matter. Accordingly, sufficient hydrophobic property can be given to the surfaces of the hydrogen absorbing alloy particles. Further, because the fluororesin is fixed to the nickel porous matter having a three-dimensional structure, the fluororesin is not easily disconnected from the skeleton of the nickel porous matter regardless of expansion of the negative electrode caused by repetition of charging/discharging, so that stable internal gas pressure of the battery can be obtained.

EMBODIMENTS

EXAMPLE 1

Figures 1A, 1B:
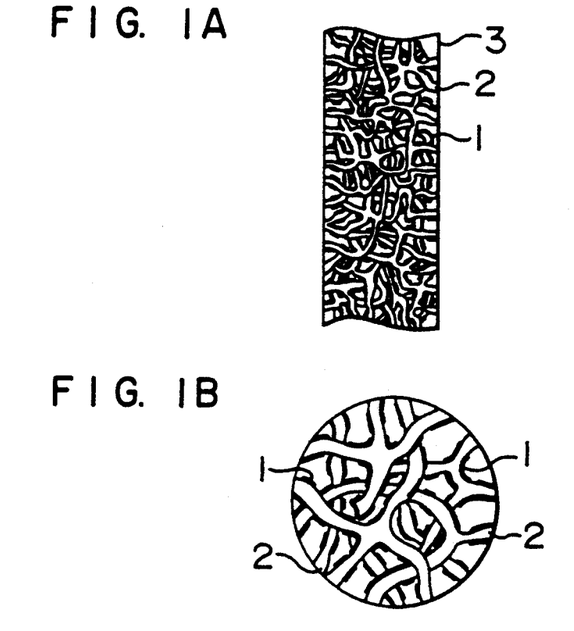
FIG. 1A is a schematic sectional view of a supporter of a three-dimensional structure having hydrophobic property, in which PTFE is fixed to a surface portion of a skeleton of a sponge-like nickel porous matter, as an embodiment of the present invention.
FIG. 1B is a typical enlarged view of the support depicted in FIG. 1A.
Figure 2:
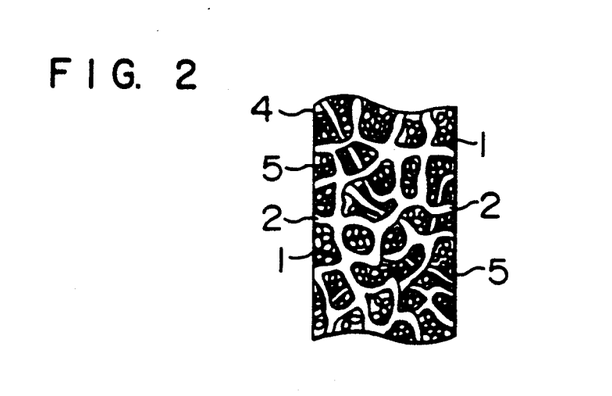
FIG. 2 is a sectional view of a negative electrode prepared by filling the supporter of a three-dimensional structure support having hydrophobic property with hydrogen absorbing alloy powder.
Figure 3:
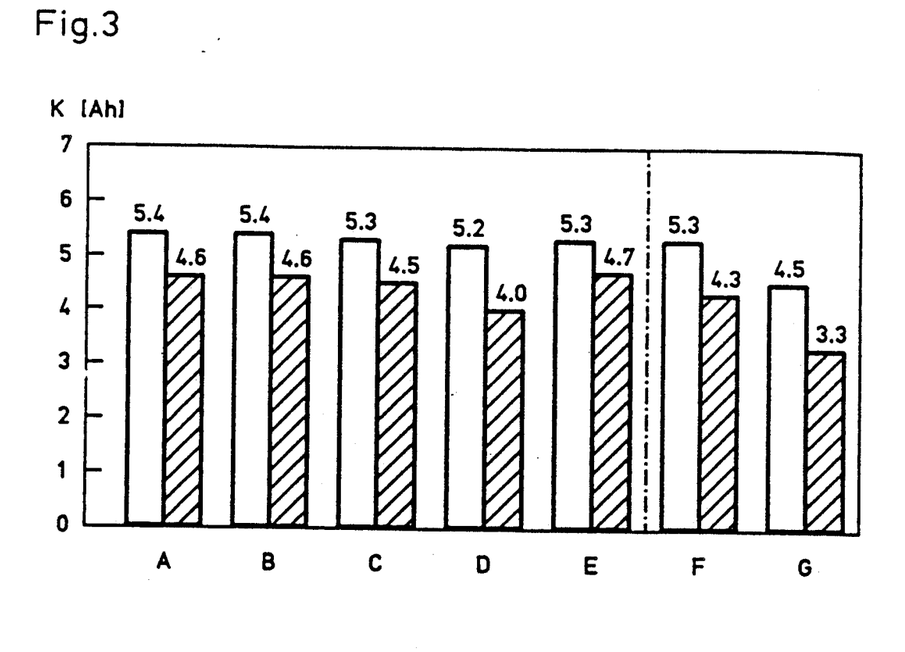
FIG. 3 is a sectional view of a negative electrode in which a layer of PTFE is provided in the surface portion thereof.
Figure 4:
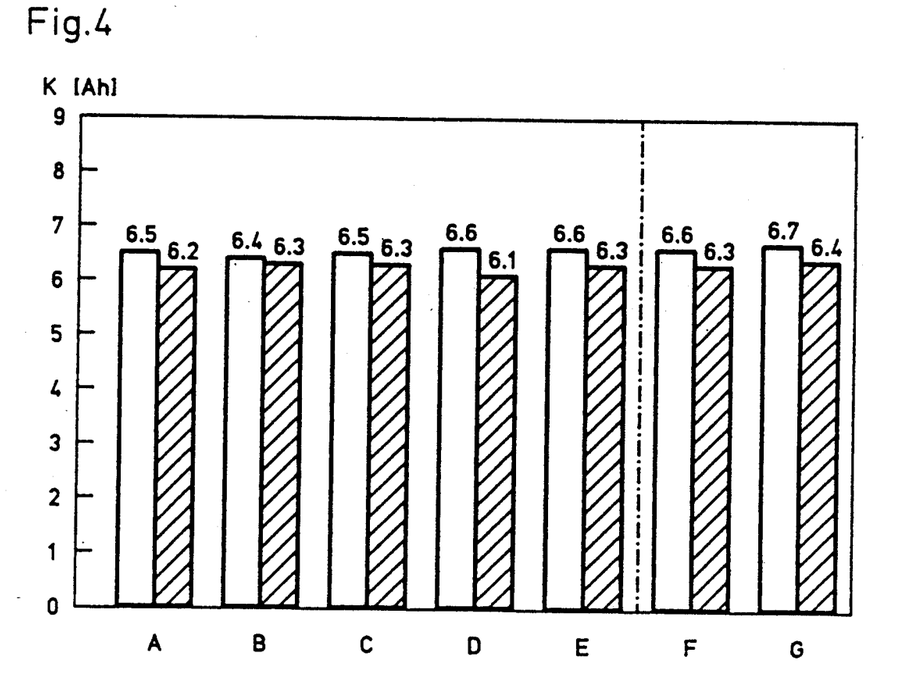
FIG. 4 is a schematic sectional view of a sealed nickel-hydrogen storage battery having a capacity of 1000 mAh.
Figure 5:
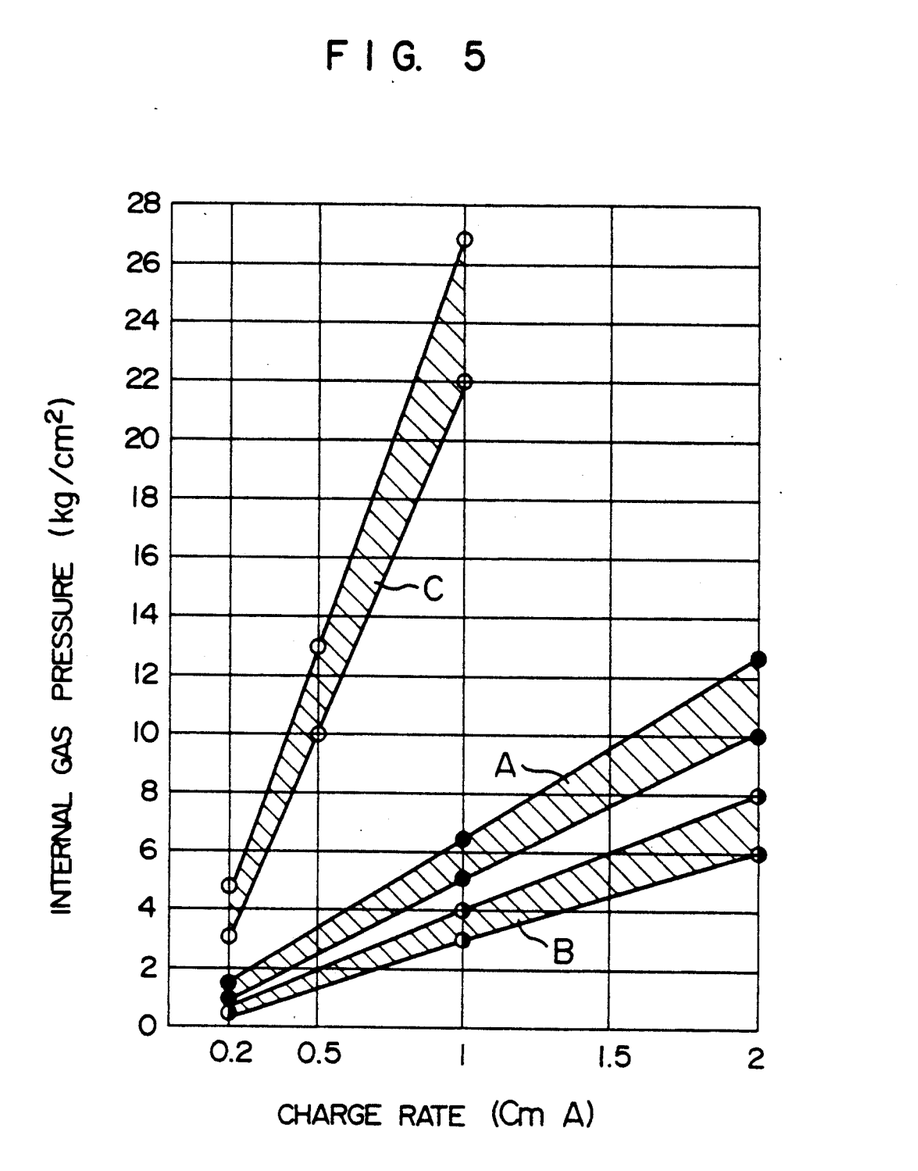
FIG. 5 is a graph view showing the relationship between the charge rate and the internal gas pressure of the battery.

Now, the present invention will be described in conjunction with various examples. FIGS. 1A and 1B show a supporter of a three-dimensional structure having hydrophobic property as an embodiment of the present invention. FIG. 1A is a sectional view of the supporter, and FIG. 1B is a typical enlarged view of the supporter. In FIGS. 1A and 1B, the reference numeral 1 designates a fluoreresin, 2 a skeleton formed of nickel, and 3 a supporter having a three-dimensional structure. The supporter of a three-dimensional structure having hydrophobic property was prepared as follows. An available sponge-like nickel porous matter (30 mg/cm$^2$ by weight per apparent unit area) having a porosity of 95% was dipped into an aqueous solution dispersion of fluororesin powder (PTFE) to deposit the fluororesin on the skeletal portion of the nickel porous matter. Then, the fluororesin in an amount of 7.5% by weight was fixed to the skeletal portion of the nickel porous matter by heat treatment in the atmosphere of 300° C. to thereby prepare a support of a three-dimensional structure having a hydrophobic portion. FIGS. 2 and 3 are sectional views showing examples of negative electrodes constructed by using the support having hydrophobic property. FIG. 4 is a schematic view of an AA-size sealed nickel-hydrogen storage battery constructed by using these negative electrodes. The negative electrodes as shown in FIGS. 2 and 3 were respectively prepared as follows. Hydrogen absorbing alloy powder 5 using MmNi$_{3.8}$Mn$_{0.4}$Al$_{0.3}$Co$_{0.5}$ with a theoretical capacity of 250 mAh/g and an average particle size of 12 μm and water were mixed to prepare paste having a water content of about 20%. The aforementioned porous matter of a three-dimensional structure (thickness; 1.2 mm) having hydrophobic property was filled with the paste. After drying the paste, the porous matter was pressed into a thickness of 0.5 mm and cut into a size of 39 mm×80 mm, thereby preparing a negative electrode A having a porosity of 31% as shown in FIG. 2. On the other hand, a negative electrode was prepared in the same manner as the negative electrode A. PTFE powder was deposited on the surface of the negative electrode by using a spray coating instrument equipped with static generator. Then, the PTFE powder was fixed to the surface portion of the negative electrode by pressing. Then, the resulting negative electrode was cut into the same size as that of the negative electrode A, thereby preparing a negative electrode B as shown in FIG. 3. Consequently, the negative electrode B was coated with a PTFE powder layer 6 in an amount of 0.48 mg/cm$^2$. As a comparative example, a negative electrode C was prepared in the same manner as the negative electrode A, except that the supporter of the negative electrode C was formed of a sponge-like nickel porous matter having a porosity of 95% without fluororesin deposited thereon. Then, by using the negative electrodes thus prepared, ten cells of AA-size sealed nickel-hydrogen storage batteries limited by the positive electrode capacity of 1000 mAh were respectively prepared to have a spiral structure constituted by a negative electrode 7, a known foamed metal type nickel positive electrode 8 and a separator 9 prepared by sulfonated polypropylene non-woven fabric and disposed between the negative electrode 7 and the positive electrode 8 as shown in FIG. 4. The condition of the battery design was that the chargeable capacity of the negative electrode was established to be from 1.3 times to 1.4 times as much as that of the positive electrode. A KOH aqueous solution having specific gravity of 1.30 and saturated with LiOH.H$_2$O was poured into the respective battery cases 10 by an amount of 2.2 cm$^3$. The reference numeral 11 designates a gasket for insulating the edge of a sealing plate 14 and a positive electrode terminal cap 15 from the battery case 10. The reference numeral 12 designates an insulating plate for insulating the inner bottom portion of the battery case from the lower portion of the spiral electrodes. The reference numeral 16 designates a positive electrode lead for electrically connecting the nickel positive electrode to the sealing plate. Although the safety vent is, in general, operated by pressure of 10 to 15 kg/cm$^2$, the safety vent 13 in this embodiment is established to be operated by pressure of not less than 30 kg/cm$^2$ for the purpose of measuring the internal gas pressure of the battery. The internal gas pressure of the battery was measured as follows. After assembled, the battery was charged with 0.1 cmA for 15 hours in an atmosphere of 20° C, and then discharged with 0.2 cmA to 1.0 V. Then, a 1 mm φ hole was formed in the bottom portion of the battery case 10. The battery was fixed to an apparatus provided with a pressure sensor. The internal gas pressure of the battery was measured with the pressure sensor at the point of time when the battery was charged by 150% with the charge rate changed to various values. FIG. 5 shows the relation between the charge rate and the internal gas pressure of the battery with respect to the batteries respectively constituted by using the negative electrodes A, B and C. In FIG. 5 the symbols A, B and C show characteristics of the batteries using the negative electrodes A, B and C, respectively. In the comparative example C, the internal gas pressure of the battery was within a range of from 22 to 27 kg/cm$^2$ when the battery was rapidly charged at 1 cmA. Accordingly, in an actual battery having a safety vent which is actuated to open by pressure of 10 to 15 kg/cm$^2$, rapid charging is impossible. Compared with the battery using the negative electrode C, the batteries using the negative electrodes A and B were excellent in characteristics as shown by the symbols A and B in FIG. 5. In short, the internal gas pressure of the battery A was within a range of from 5 to 6.4 kg/cm$^2$ when the battery was charged at 1 cmA, and the internal gas pressure of the battery B was within a range of from 3 to 4 kg/cm$^2$ when the battery was charged at 1 cmA. Furthermore, in the cases of the batteries A and B, the battery internal pressure increased little regardless of repetition of charging/discharging 500 times. Consequently, the batteries A and B showed excellent characteristics, respectively.

Although this example has shown the case where the fluororesin is disposed in the skeletal surface portion of the sponge-like nickel porous matter as a supporter of a three-dimension structure having hydrophobic property, the same effect can be attained as long as hydrophobic property can be given to selected one of porous or foam matters of resins, such as polypropylene, polyethylene, polyamide, ABS, polysulfone, poly(vinyl chloride) and the like, and hydrophobic porous supporter of carbon or nickel fibers. If the porosity of the nickel porous matter having a three-dimensional structure is not more than 90%, the capacity density of the negative electrode is lowered so that battery internal pressure increases when the battery is constructed under the conditions as described above. Accordingly, it is preferable that the porosity is not less than 80%.

Further, if the weight per apparent unit area of the nickel porous matter becomes not less than 60 mg/cm$^2$, the porosity of the negative electrode prepared by filling the porous matter with the hydrogen absorbing alloy by a predetermined amount becomes not more than 28% to thereby increase battery internal pressure. If the weight becomes not more than 20 mg/cm$^2$, on the contrary, mechanical strength of the nickel porous matter is lowered to make it difficult to fill the porous matter with the hydrogen absorbing alloy. If the porosity of the negative electrode becomes not more than 28%, the hydrogen gas absorbing reaction area thereof is lowered so that battery internal pressure increases. If porosity becomes not less than 35%, on the contrary, the capacity density of the negative electrode is lowered to make it impossible to construct a sealed battery of positive electrode capacity limitation.

EXAMPLE 2

An available sponge-like nickel porous matter having a porosity of 95% was dipped into an aqueous solution dispersion containing 70 part by weight of PTFE powder and 30 part by weight of palladium black powder capable of catalyzing the decomposition (H$_2$→2H) of hydrogen gas, to deposit the PTFE powder and the palladium black powder on the skeletal portion of the nickel porous matter in the ratio 70:30. Then the porous matter was heated at 300° C. to prepare a support of a three-dimensional structure having a mixture of PTFE and palladium black at its skeletal portion. A negative electrode D was prepared by using the supporter in the same manner as in the Example 1. Then, a mixture of PTFE and palladium black in the ratio 70:30 was applied to the surface of the negative electrode D to prepare a negative electrode E having a layer of the mixture of PTFE and catalyst at its surface portion in the same manner as in the Example 1. On the other hand, a sponge-like nickel porous matter was dipped into an aqueous solution dispersion containing 70 part by weight of PTFE powder and 30 part by weight of acetylene black powder having electron conductivity, thereby depositing the mixture of PTFE powder and acetylene black powder on the skeletal portion of the nickel porous matter. Then, the porous matter was treated in an atmosphere of 300° C. to prepare a support of a three-dimensional structure having the mixture of PTFE and acetylene black at its skeletal portion. A negative electrode F was prepared by using this supporter in the same manner as in the Example 1. Then, a mixture of PTFE and palladium black in the weight ratio 70:30 was applied to the surface of the negative electrode F to prepare a negative electrode G having a layer of the mixture of PTFE and electron conductive matter at its surface portion in the same manner as in the Example 1. By using the negative electrodes (D, E, F and G), various batteries were prepared in the same manner as in the Example 1. The values of battery internal pressure of the batteries at the point of time when the respective battery was charged by 150% with 1 cmA are shown in Table 1. The results of the batteries A, B and C in the Example 1 are also shown in the Table 1.

TABLE 1

| Battery | Negative Electrode | Internal Gas Pressure | Capacity Ratio |
|---|---|---|---|
| A | A | 5 ~ 6.4 kg/cm$^2$ | 74 ~ 76% |
| B | B | 3 ~ 4 kg/cm$^2$ | 72 ~ 75% |
| C | C | 22 ~ 27 kg/cm$^2$ | 80 ~ 83% |
| D | D | 4 ~ 5.2 kg/cm$^2$ | 79 ~ 82% |
| E | E | 2 ~ 2.8 kg/cm$^2$ | 80 ~ 83% |
| F | F | 5 ~ 7 kg/cm$^2$ | 79 ~ 82% |
| G | G | 3 ~ 5 kg/cm$^2$ | 79 ~ 83% |

Further, the discharge characteristic in each of the batteries using the negative electrodes A to G was examined. In the Table 1, the discharge characteristic is expressed as a capacity ratio [capacity ratio=(the capacity when discharged with 3 cmA)/(the capacity when discharged with 0.2 cmA)×100%] of the capacity when each battery was discharged with 3 cmA to 1.0 V to the capacity when discharged with 0.2 cmA to 1.0 V after charged in an atmosphere of 20° C. The larger the value of the capacity ratio, the more excellent the discharge characteristic. The values of internal gas pressure of the respective batteries using the negative electrodes D and E were within a range of from 4 to 5.2 kg/cm$^2$ and within a range of from 2 to 2.8 kg/cm$^2$, respectively. In the cases of the negative electrodes D and E, the battery internal pressure was reduced because of the presence of palladium black capable of catalyzing the decomposition of a hydrogen gas, compared with the cases of the negative electrodes A and B. In short, the batteries using the negative electrodes D and E showed excellent characteristics. The values of internal gas pressure of the batteries F and G using the sponge-like nickel porous matter having the mixture of acetylene black and PTFE at its skeletal portion were excellent similarly to the values of internal gas pressure of the batteries A and B. On the contrary, the discharge characteristic of the battery C using the negative electrode C as a comparative example was so good that the capacity ratio was from 80 to 83%. The capacity ratio of the batteries using the negative electrodes A and B were within a range of from 74 to 76% and within a range of from 72 to 75%, respectively, the values being slightly lower than the value in the case of the negative electrode C. This is because the surface portion of the nickel porous matter having electron conductivity was coated with PTFE having little electron conductivity. In other words, this is because the contacting area between the hydrogen absorbing alloy powder and the skeleton of nickel decreased. On the other hand, the discharge characteristics of the batteries F and G using the supporter having the mixture of PTFE and acetylene black at its skeletal portion were within a range of from 79 to 82% and within a range of from 79 to 83%, respectively, the values being excellent similarly to the value in the case of the battery C. Also the discharge characteristics of the batteries D and E showed values similar to the value in the case of the battery C. This is because acetylene black having electron conductivity and palladium black having both catalystic property and electron conductivity existed in the surface portion of the skeleton of nickel.

Although this example has shown the case where palladium black is used as a material capable of catalyzing the decomposition of a hydrogen gas, the same effect can be attained even in the case where another catalyst, such as platinum, platinum carrying carbon, palladium carrying carbon or the like, is used. Although this example has shown the case where acetylene black is used as a material having electron conductivity, the same effect can be attained even in the case where another material having electron conductivity, such as nickel powder, carbon black or the like, is used. Further, the portion having hydrophobic property may be formed of a mixture of PTFE, a catalystic material and a conductive material.

EXAMPLE 3

A supporter formed of a sponge-like nickel porous matter having hydrophobic property in the same manner as in the Example 1 was filled with paste prepared by mixing hydrogen absorbing alloy powder having a mean particle diameter of 12 $\mu$m and represented by the formula $MmNi_{3.8}Mn_{0.4}Al_{0.3}Co_{0.5}$ and a polyvinyl alcohol aqueous solution as a hydrophilic material. While the polyvinyl alcohol concentration of the aqueous solution was changed, negative electrodes H, I, J and K were prepared in the same manner as the negative electrode A in the Example 1. The negative electrodes H, I, J and K contained polyvinyl alcohol by amounts of 0.02 wt %, 0.18 wt %, 0.25 wt % and 0.3 wt %, respectively. Then, a PTFE layer was formed on each of the negative electrodes prepared in the same manner as the negative electrodes H, I, J and K, thereby preparing negative electrodes L, M, N and O. By using these negative electrodes, various batteries were prepared in the same manner as in the Example 1 (except that the safety vent in each of the batteries was set to be actuated to open by pressure of 12 kg/cm²). The internal gas pressure and charge/discharge cycle life were examined. The cycle life test was conducted under the condition that the battery was charged with 1 cmA for 1.5 hours in an atmosphere of 20° C. and then discharged with 1 cmA until the terminal voltage reached 1.0 V. The discharge capacity in each cycle was examined in the cycle life test. The measurement condition of battery internal pressure was the same as in the Example 1. The internal gas pressure of the batteries using various negative electrodes and the cycle number when the discharge capacity was reduced by 10% relative to the initial capacity are shown in Table 2. Further, the characteristics of the batteries using the negative electrodes A and B containing no polyvinyl alcohol are also shown in the Table 2.

The internal pressure in each of the batteries H, I, J, L, M and N using negative electrodes containing polyvinyl alcohol by the amounts of 0.02 wt %, 0.18 wt % and 0.25 wt % was excellent similarly to that in each of the batteries A and B using negative electrodes containing no polyvinyl alcohol. However, the internal pressure in each of the batteries K and O using negative electrodes containing polyvinyl alcohol by an amount of 0.3 wt % was increased compared with that in each of the batteries A and B. Accordingly, it is preferable that the negative electrode contains polyvinyl alcohol by an amount of not more than 0.25 wt %. On the other hand, the cycle life in each of the batteries H, I, J, L, M and N was improved compared with that in each of the batteries A and B. This is because hydrophobic polyvinyl alcohol existing in the negative electrode keeps the electrolyte in the negative electrode regardless of expansion of the position electrode caused by repetition of charge/discharge cycles. On the other hand, the cycle life in each of the batteries K and L was short. This is because the surfaces of the alloy particles are covered with polyvinyl alcohol to thereby reduce the hydrogen absorbing capacity and increase the battery internal pressure, so that the safety vent is actuated to thereby reduce the discharge capacity. Accordingly, it is preferable that the negative electrode contains polyvinyl alcohol by an amount within a range of from 0.02 to 0.25 wt %.

Although this example has shown the case where polyvinyl alcohol is used as a hydrophilic material, the same effect can be attained even in the case where another hydrophilic material, such as carboxymethylcellulose, methylcellulose or the like, is used.

TABLE 2

| Battery | Negative Electrode | Concentration of hydrophobic polyvinyl alcohol in negative elec trode | Internal Gas pressure | Cycle Life |
|---|---|---|---|---|
| A | A | 0 wt % | 5 ~ 6.4 kg/cm² | 450 ~ 500 cycles |
| B | B | 0 wt % | 3 ~ 4 kg/cm² | 450 ~ 500 cycles |
| H | H | 0.02 wt % | 5 ~ 6.4 kg/cm² | 480 ~ 520 cycles |
| I | I | 0.18 wt % | 5 ~ 6.4 kg/cm² | 500 ~ 550 cycles |
| J | J | 0.25 wt % | 5.5 ~ 7 kg/cm² | 500 ~ 550 cycles |
| K | K | 0.3 wt % | 9 ~ 12 kg/cm² | 200 ~ 300 cycles |
| L | L | 0.02 wt % | 3 ~ 4 kg/cm² | 480 ~ 520 cycles |
| M | M | 0.18 wt % | 3 ~ 4 kg/cm² | 500 ~ 550 cycles |
| N | N | 0.25 wt % | 3.5 ~ 5 kg/cm² | 500 ~ 550 cycles |
| O | O | 0.3 wt % | 8 ~ 12 kg/cm² | 200 ~ 300 cycles |

EXAMPLE 4

Negative electrodes P, Q, R, S, T and U were prepared in the same manner as the negative electrode B in the Example 1 while the quantity of PTFE to be applied to the surface thereof was changed variously. By using the negative electrodes P, Q, R, S, T and U, various batteries were prepared in the same manner as in the Example 1. The internal gas pressure in each of the batteries was examined. The results of examination are shown in Table 3.

TABLE 3

| Battery | Negative Electrode | Surface Coating Amount of PTFE | Internal Gas Pressure |
|---|---|---|---|
| P | P | 0.1 mg/cm² | 5 ~ 6 Kg/cm² |
| Q | Q | 0.15 mg/cm² | 4 ~ 5 Kg/cm² |
| R | R | 0.5 mg/cm² | 3 ~ 4 Kg/cm² |
| S | S | 1.0 mg/cm² | 3 ~ 4 Kg/cm² |
| T | T | 1.5 mg/cm² | 4 ~ 5 Kg/cm² |

TABLE 3-continued

| Battery | Negative Electrode | Surface Coating Amount of PTFE | Internal Gas Pressure |
|---|---|---|---|
| U | U | 2.0 mg/cm$^2$ | 7 ~ 9 Kg/cm$^2$ |

The internal pressure in each of the batteries Q, R, S and T using the negative electrodes respectively coated with PTFE by amounts of 0.15 mg/cm$^2$, 0.5 mg/cm$^2$, 1.0 mg/cm$^2$ and 1.5 mg/cm$^2$ was not more than 5 kg/cm$^2$ and was very excellent. On the other hand, the internal gas pressure of the battery P using the negative electrode coated with PTFE by an amount of 0.1 mg/cm$^2$ was similar to that of the battery A in the Example 1. In the battery P, there was no effect by the coating of PTFE on the surface of the negative electrode. The internal gas pressure of the battery U using the negative electrode coated with PTFE by an amount of 2.0 mg/cm$^2$ was increased to be within a range of from 7 to 9 kg/cm$^2$. This is because the hydrophobic resin in the surface of the negative electrode increases to suppress absorption of the electrolyte into the negative electrode to thereby deteriorate charge efficiency of the negative electrode. Accordingly, it is preferable that the quantity of PTFE deposited on the surface portion of the negative electrode is within a range of from 0.15 to 1.5 mg/cm$^2$.

EXAMPLE 5

Various negative electrodes V, W, X and Y were prepared in the same manner as the negative electrode A in the Example 1, except that the temperature for heat treatment after deposition of PTFE was changed variously to 150° C., 200° C., 400° C. and 450° C. By using the negative electrodes thus prepared, various batteries were prepared. The battery internal pressure and cycle life (under the condition that the operation pressure of the safety vent used in the cycle life test was 12 kg/cm$^2$) were examined in the same manner as in the Examples 1 and 3. The results of examination are shown in Table 4. The characteristics of the battery using the negative electrode A in the Example 1 were also shown in the Table 4.

TABLE 4

| Battery | Negative Electrode | Heat-treatment Temperature | Internal Gas Pressure | Cycle life |
|---|---|---|---|---|
| V | V | 150° C. | 10 ~ 12 Kg/cm$^2$ | 200 ~ 250 cycles |
| W | W | 200° C. | 5 ~ 6.4 Kg/cm$^2$ | 450 ~ 480 cycles |
| A | A | 300° C. | 5 ~ 6.4 Kg/cm$^2$ | 450 ~ 500 cycles |
| X | X | 400° C. | 5 ~ 6.4 Kg/cm$^2$ | 480 ~ 530 cycles |
| Y | Y | 450° C. | 10 ~ 12 Kg/cm$^2$ | 250 ~ 300 cycles |

Each of the batteries W, A and X using the supports prepared by the steps of depositing PTFE on the skeletal portion of the sponge-like nickel porous matter, and heat-treating the porous matter at a temperature of 200° to 400° C., was excellent in battery internal pressure and cycle life. On the other hand, the internal gas pressure of the battery V using the supporter subjected to be within a range of from 10 to 12 kg/cm$^2$. Further, the cycle life of the battery V was within a range of from 200 to 250 cycles. Consequently, the characteristics of the battery V were deteriorated. This is because PTFE could not be sufficiently fixed to the skeletal surface portion of the nickel porous matter when the temperature for heat treatment was 150° C., so that PTFE was dropped out of the skeleton during the impregnating of the porous matter with the paste or with repetition of charge/discharge cycles to thereby reduce hydrophobic property of the negative electrode. On the contrary, when the temperature for heat treatment reached 450° C. as shown in the battery Y, PTFE was partly decomposed to thereby reduce hydrophobic property of the negative electrode and shorten the cycle life. Accordingly, it is preferable that the temperature for heat treatment is to be within a range of from 200° to 400° C.

Next, a negative electrode Z in which PTFE was coated on the surface of the negative electrode but not fixed by pressing was prepared in the same manner as the negative electrode B in the Example 1. By using the negative electrode Z, a battery was prepared in the same manner as in the Example 1. The internal gas pressure and cycle life of the battery thus prepared were examined. The internal gas pressure of the battery using the negative electrode Z was within a range of from 3 to 4 kg/cm$^2$ and was excellent similarly to that of the battery B in the Example 1. However, the internal gas pressure of the battery was increased with repetition of charge/discharge cycles. When charge/discharge was repeated by 400 cycles, the internal gas pressure of the battery became not less than 12 kg/cm$^2$ to operate the safety vent to make a gas and the electrolyte escape to thereby reduce the discharge capacity. This is because PTFE was not sufficiently fixed to the surface portion of the negative electrode so that PTFE was dropped out of the surface portion of the negative electrode with repetition of charge/discharge cycles.

As described above, according to the present invention, in a sealed alkaline storage battery comprising a positive electrode constituted mainly by a metal oxide, a negative electrode constituted mainly by a hydrogen absorbing alloy capable of absorbing/desorbing hydrogen acting as an active material and a supporter for supporting said alloy, an alkaline electrolyte, and a separator, an effect to enable rapid charging (1 cmA) to be performed can be obtained by making the supporter to have a three-dimensional structure having hydrophobic property. Further, an effect to enable more rapid charging (2 cmA) to be performed can be obtained by providing a portion having hydrophobic property on a surface portion of the negative electrode.

Further, in the method of producing a negative electrode for the above-mentioned sealed alkaline storage battery, it is possible to obtain an effect that a sealed alkaline storage battery capable of being subject to rapid charging and excellent in cycle life against repetition charge/discharge can be produced by employing the steps of: depositing a fluororesin on a skeletal portion of a nickel porous matter having a three-dimensional structure; fixing the fluororesin to the skeletal portion of the nickel porous matter by heat treatment at a temperature lower than the temperature of decomposition of the fluororesin to thereby prepare a support having a hydrophobic portion; and preparing a negative electrode through filling the supporter with paste mainly containing a hydrogen absorbing alloy, drying the paste and then pressing/cutting the support into predetermined thickness and size.

We claim:

1. A sealed alkaline storage battery comprising: a positive electrode including a metal oxide as a main constitutent material thereof; a negative electrode including, as a main constituent material thereof, a hydrogen absorbing alloy capable of absorbing/desorbing hydrogen acting as an active material and a supporter for supporting said alloy; an alkaline electrolyte; and a separator; said supporter being a three-dimensional porous body and having a hydrophobic property together with electrical conductivity.

2. A sealed alkaline storage battery according to claim 1, in which said supporter is formed of a nickel porous matter having a three-dimensional structure with a porosity of 80%, said nickel porous matter containing a hydrophobic material at a skeletal surface portion thereof.

3. A sealed alkaline storage battery according to claim 1, in which said supporter has a hydrophobic portion composed of a mixture of a hydrophobic material and a material capable of catalyzing the decomposition of a hydrogen gas.

4. A sealed alkaline storage battery according to claim 1, in which said supporter has a hydrophobic portion composed of a mixture of a hydrophobic material and an electron conductive material.

5. A sealed alkaline storage battery according to claim 1, in which said negative electrode includes a hydrophilic material by an amount within a range of from 0.05 to 0.25% by weight.

6. A sealed alkaline storage battery according to claim 1, in which said negative electrode using the supporter of a three-dimensional structure having hydrophobic property has a porosity within a range of from 28 to 38%.

7. A sealed alkaline storage battery according to claim 1, in which said metal oxide included in said positive electrode as its main constituent material is a nickel oxide.

8. A sealed alkaline storage battery according to claim 1, in which said metal oxide included in said positive electrode as its main constituent material is a manganese oxide.

9. A sealed alkaline storage battery according to claim 2, in which said nickel porous matter having a three-dimensional structure has a weight per apparent unit area within a range of from 20 to 60 mg/cm$^2$.

10. A sealed alkaline storage battery according to claim 2, in which said hydrophobic material in said skeletal surface portion of said nickel porous matter is given by an amount within a range of from 2 to 36% by weight relative to the total weight of said porous matter.

11. A sealed alkaline storage battery comprising: a positive electrode, including a metal oxide as a main constituent material thereof; a negative electrode including, as main constituent materials thereof, a hydrogen absorbing alloy capable of absorbing/desorbing hydrogen acting as an active material and a supporter for supporting said alloy; an alkaline electrolyte; and a separator; said support being a three-dimensional porous body and having a hydrophobic property together with electrical conductivity and said negative electrode including a surface portion having a hydrophobic property.

12. A sealed alkaline storage battery according to claim 11, in which said supporter is formed of a nickel porous matter having a three-dimensional structure with a porosity of 80%, said nickel porous matter having a hydrophobic material at a skeletal surface portion thereof.

13. A sealed alkaline storage battery according to claim 11, in which a hydrophobic material is deposited on the surface portion of said negative electrode by a mean amount within a range of from 0.15 mg/cm$^2$ to 1.5 mg/cm$^2$.

14. A sealed alkaline storage battery according to claim 11, in which said supporter has a hydrophobic portion including a mixture of a hydrophobic material and a material capable of catalyzing the decomposition of a hydrogen gas.

15. A sealed alkaline storage battery according to claim 11, in which said supporter has a hydrophobic portion including a mixture of a hydrophobic material and an electron conductive material.

16. A sealed alkaline storage battery according to claim 11, in which said negative electrode includes a hydrophilic material by an amount within a range of from 0.02 to 0.25% by weight.

17. A sealed alkaline storage battery according to claim 11, in which said negative electrode using the supporter of a three-dimensional structure having hydrophobic property has a porosity within a range of from 28 to 38%.

18. A sealed alkaline storage battery according to claim 11, in which said metal oxide included in said positive electrode as its main constituent material is a nickel oxide.

19. A sealed alkaline storage battery according to claim 11, in which said metal oxide included in said positive electrode as its main constituent material is a manganese oxide.

20. A sealed alkaline storage battery according to claim 12, in which said nickel porous matter having a three-dimensional structure has a weight per apparent unit area within a range of from 20 to 60 mg/cm$^2$.

21. A sealed alkaline storage battery according to claim 12, in which said hydrophobic material in said skeletal surface portion of said nickel porous matter is given by an amount within a range of from 2 to 35% by weight relative to the total weight of said porous matter.

* * * * *